(12) United States Patent
Walker (10) Patent No.: US 7,640,392 B2
(45) Date of Patent: Dec. 29, 2009

(54) NON-DRAM INDICATOR AND METHOD OF ACCESSING DATA NOT STORED IN DRAM ARRAY

(75) Inventor: Robert Michael Walker, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 11/165,950

(22) Filed: Jun. 23, 2005

(65) Prior Publication Data

US 2006/0294294 A1    Dec. 28, 2006

(51) Int. Cl.
G06F 13/00    (2006.01)
G11C 7/04    (2006.01)

(52) U.S. Cl. .................. 711/106; 711/105; 365/212; 374/141

(58) Field of Classification Search .................. 711/106; 374/141; 365/212
See application file for complete search history.

(56) References Cited

U.S. PATENT DOCUMENTS

| | | | |
|---|---|---|---|
| 5,787,255 A * | 7/1998 | Parlan et al. ............... | 709/233 |
| 6,401,213 B1 | 6/2002 | Jeddeloh | |
| 6,453,218 B1 * | 9/2002 | Vergis ....................... | 700/299 |
| 6,667,905 B2 | 12/2003 | Dono et al. | |
| 6,728,798 B1 | 4/2004 | Roohparvar | |
| 6,757,857 B2 | 6/2004 | Lamb et al. | |
| 6,778,459 B2 | 8/2004 | Blodgett | |
| 6,957,308 B1 * | 10/2005 | Patel ......................... | 711/154 |
| 7,096,283 B2 | 8/2006 | Roohparvar | |
| 7,230,876 B2 | 6/2007 | Walker | |

(Continued)

FOREIGN PATENT DOCUMENTS

EP    0797207    9/1997

(Continued)

OTHER PUBLICATIONS

Gillingham P et al:"SLDRAM:High Performance, Open-Standard Memory" IEEE Micro, IEEE Service Center, Los Alamitos, CA, US, vol. 17, No. 6, Nov. 1997 (Nov. 1997), pp. 29-39, XP000726002 ISSN: 0272-1732 pp. 31-36.

(Continued)

*Primary Examiner*—Matt Kim
*Assistant Examiner*—Michael C Krofcheck
(74) *Attorney, Agent, or Firm*—Peter M. Kamarchik; Nicholas J. Pauley; Sam Talpalatsky (57) ABSTRACT

Data not stored in the DRAM array of a SDRAM module, such as the output of a temperature sensor, are read from the SDRAM in a synchronous read cycle that is seamlessly interspersed with SDRAM read and write cycles directed to data in the DRAM array. Control information, including a non-DRAM indicator in the case of data not stored in a DRAM array, are maintained for all read cycles. Returned data stored in a DRAM array and data not stored in a DRAM array are buffered together. When extracting read data from the buffer, data not stored in a DRAM array are identified by the non-DRAM indicator and directed to circuits within the controller. When data not stored in the DRAM array indicates the temperature of the SDRAM die, the controller may adjust the refresh rate in response to the temperature.

20 Claims, 4 Drawing Sheets

U.S. PATENT DOCUMENTS

| | | |
|---|---|---|
| 2005/0007864 A1 | 1/2005 | Chung et al. |
| 2005/0060481 A1 | 3/2005 | Bleonozink |
| 2006/0239095 A1* | 10/2006 | Shi et al. ............... 365/222 |
| 2006/0265615 A1 | 11/2006 | Jenzen et al. |
| 2007/0047378 A1 | 3/2007 | Wolford |

FOREIGN PATENT DOCUMENTS

| | | |
|---|---|---|
| EP | 0851427 | 7/1998 |

OTHER PUBLICATIONS

International Preliminary Examination Report-PCT/US06/024498, International Search Authority-European Patent Office-Dec. 24, 2007.

International Search Report-PCT/US06/024498, International Search Authority-European Patent Office-Apr. 10, 2007.

JEDEC Standard; "Double Data Rate (DDR) SDRAM Specification", JESD79E (May 2005).

Written Opinion-PCT/US06/024498, International Search Authority-European Patent Office-Apr. 10, 2007.

* cited by examiner

NON-DRAM INDICATOR AND METHOD OF ACCESSING DATA NOT STORED IN DRAM ARRAY

BACKGROUND

The present invention relates generally to the field of memory and in particular to an efficient method of reading data from an SDRAM that is not stored in a DRAM array.

Portable electronic devices have become ubiquitous accoutrements to modern life. Two relentless trends in portable electronic devices are increased functionality and decreased size. Increased functionality demands higher computing power and more memory. The decreasing size of portable electronic devices places a premium on power consumption, as smaller batteries can store and deliver less power. Thus, advances that increase performance and decrease power consumption are advantageous for portable electronic devices.

Most portable electronic devices include Dynamic Random Access Memory (DRAM) to store instructions and data for a processor or other controller. DRAM is the most cost-effective solid-state memory technology available. While the price per bit is lower for mass storage technologies such as disk drives, the high access latency, high power consumption, and high sensitivity to shock or vibration preclude the use of mass storage drives in many portable electronic device applications.

Synchronous DRAM (SDRAM) offers both improved performance and simplified interface design over conventional DRAM by aligning all control signals and data transfer cycles to clock edges. Double data rate (DDR) SDRAM allows data transfers on both rising and falling edges of the clock, providing still higher performance.

Most SDRAM modules include a mode register to store configurable parameters such as CAS latency, burst length, and the like. As SDRAM technology increased in complexity and configurability, many SDRAM modules added an extended mode register to store additional configurable parameters such as Delay Locked Loop (DLL) enable, drive strength, and the like. Both the mode register and extended mode register are write-only. That is, there is no provision for a controller to read the contents of these registers. With the introduction of the mode and extended mode registers, a DRAM module for the first time stored information other than the data written to and read from the DRAM array. Consequently, a new data transfer operation was required.

Many SDRAM modules include Mode Register Set (MRS) and Extended Mode Register Set (EMRS) operations to load the registers with the desired parameters. These operations are commonly implemented by simultaneously driving the CS, RAS, CAS, and WE control signals low, selecting between the MRS and EMRS with bank address bits, and providing the information to be written to the selected register on address lines A0-A11. In most implementations, all DRAM banks must be inactive at the time of the MRS or EMRS command, and no further operation may be directed to the SDRAM module for a specified minimum duration, such as six clock cycles. These restrictions do not adversely impact the SDRAM performance, since due to the nature of the mode and extended mode registers, they are written once upon initialization and never changed.

The third-generation Graphics Double Data Rate industry specification (GDDR3) provides the ability to read information from an SDRAM module other than data stored in the DRAM array. As one option during an EMRS operation, the SDRAM may output a vendor code and version number on the data bus (EMRS write information is transmitted on the address bus). All of the restrictions of the EMRS operation—that all banks be idle and that the operation is followed by a minimum duration, such as six clock cycles, of inactivity—must be observed. Due to the static nature of the information (vendor ID and version number), it only needs to be read once, such as during initialization, and the limitations of the EMRS operation do not significantly affect performance.

A basic aspect of DRAM operation is that the capacitive charge storing data at each bit position must be periodically renewed to preserve the data state. The DRAM array is refreshed by row; some SDRAM modules may refresh the same row in multiple DRAM banks at the same time. Each row in the DRAM array must be refreshed within a specified refresh period. The DRAM rows may be refreshed sequentially once per refresh period, known as a burst refresh. However, this prevents access to the DRAM array for the time necessary to cycle through all of the rows, and imposes a significant performance degradation. Alternatively, refresh cycles directed to each row may be spread evenly throughout the refresh period, interspersed with read and write data transfers. This is known as distributed refresh. Distributed refresh is more commonly implemented, as it imposes less of a performance penalty.

The total required refresh period, and hence the spacing of refresh cycles in a distributed refresh operation, depends on the temperature of the DRAM array dye. As a general rule of thumb, the refresh rate must be doubled for every 10° C. increase in the DRAM array die temperature. The refresh period specified for a SDRAM module is typically that required by the DRAM at its highest anticipated operating temperature. Thus, whenever the DRAM array die is at a lower temperature, the maximum refresh period is longer, and the distributed refresh cycles may be spaced further apart, thus reducing their impact on DRAM read and write accesses. This would both improve processor performance and reduce power consumption by eliminating unnecessary refresh activity.

The synchronous read cycles for accessing data from a SDRAM module that is not stored in a DRAM array may be seamlessly integrated with read and write cycles for accessing "normal" SDRAM data—that is, data stored in a DRAM array on the SDRAM module. By using the synchronous read cycles for accessing data not stored in a DRAM array, the output of a temperature sensor on the SDRAM module may be read with minimal impact on system accesses to data stored in a DRAM array on the SDRAM module. For example, all banks do not need to be closed, and no wait period is imposed on SDRAM accesses following the read cycles, as is the case in accessing extended mode register data via the GDDS3 protocol.

Since the synchronous read cycles for accessing data not stored in a DRAM array are substantially similar, in timing and sequencing, to synchronous read cycles for accessing data that is stored in a DRAM array, the identification and extraction of the returned data not stored in a DRAM array is problematic. SDRAM controllers often function in a pipelined manner, issuing requests for bursts of data, and receiving the data later (i.e., after a delay determined by the CAS latency field of the mode register). Furthermore, many SDRAM controllers further pipeline memory read operations by buffering data from a plurality of read cycles in a FIFO or other buffer, and making the data available to requesting devices after a further delay from when the data is captured from the SDRAM module by the controller.

In most cases, read operations directed to data that is not stored in a DRAM array are not requested by system modules (such as master devices in a bus or crossbar interconnect), and consequently are not forwarded by the SDRAM controller. Rather, data not stored in a DRAM array is often read by a SDRAM controller for its own consumption—that is, to obtain a temperature reading by which to adjust a refresh rate; to obtain the SDRAM module identification to adjust timing parameters; to read the mode or extended mode registers to verify that they were set properly; or the like. Thus, the read data not stored in a DRAM array must be identified and extracted from the stream of read data stored in a DRAM array, which is forwarded to requesting master devices.

One approach to identifying and extracting read data not stored in a DRAM array would be to "trap" the data immediately upon its transfer from the SDRAM memory module to the controller. However, due to the heavily pipelined architecture of many memory controllers, this approach would adversely impact performance, as it would necessitate that the controller halt "normal" SDRAM activity upon issuing a memory access cycle directed to data not stored in a DRAM array, until the data is returned. For maximum performance, the synchronous nature of read cycles directed to data not stored in a DRAM array should be fully exploited by seamlessly intermixing them with normal read accesses. This requires a mechanism for identifying and extracting the data not stored in a DRAM array further down the pipeline, such as when the memory controller extracts read data from a buffer for dispatch to the requesting master device.

SUMMARY

According to one or more embodiments, data not stored in the DRAM array of a SDRAM module, such as the output of a temperature sensor, are read from the SDRAM in a synchronous read cycle that is seamlessly interspersed with SDRAM read and write cycles directed to data in the DRAM array. Control information, including a non-DRAM indicator in the case of data not stored in a DRAM array, are maintained for all read cycles. Returned data stored in a DRAM array and data not stored in a DRAM array are buffered together. When extracting read data from the buffer, data not stored in a DRAM array are identified by the non-DRAM indicator and directed to circuits within the controller. When data not stored in the DRAM array indicates the temperature of the SDRAM die, the controller may adjust the refresh rate in response to the temperature.

One embodiment relates to a method of controlling one or more SDRAM modules. One or more memory access cycles to a SDRAM module are performed to access data not stored in a DRAM array of the SDRAM module. Each memory access cycle for the data not stored in a DRAM array is associated with a non-DRAM data identifier. After the data not stored in a DRAM array is received from a SDRAM module, the data not stored in a DRAM array is extracted in response to the non-DRAM data identifier.

Another embodiment relates to a memory controller operative to issue synchronous read cycles to a memory module, the synchronous read cycles directed to data stored in a DRAM array and to data not stored in a DRAM array. The controller includes a read data buffer operative to buffer received data stored in a DRAM array and data not stored in a DRAM array. The controller also includes a read control buffer operative to buffer control information associated with each synchronous read cycle, the information including a non-DRAM indicator in the case of read cycles directed to data not stored in a DRAM array. Additionally, the controller includes read response logic controlling the read data buffer and operative to identify and extract data not stored in a DRAM array from the read data buffer, in response to the non-DRAM indicator.

DETAILED DESCRIPTION

The transfer of data between functional units is a fundamental operation of any computer system. Most computer systems include one or more master devices, such as processors, co-processors, Direct Memory Access (DMA) engines, bus bridges, graphics engines, or the like. A master device is one that may initiate data transfer operations across a system bus or interconnect to transfer data to and/or from slave devices. Slave devices—which may include for example, memory, disk drives, Input/Output (I/O) circuits, graphics controllers, real-time clocks, and many other circuits and devices—respond to data transfer operations on the system bus by accepting write data and/or providing read data. Slave devices do not initiate bus data transfer operations.

Figure 1:
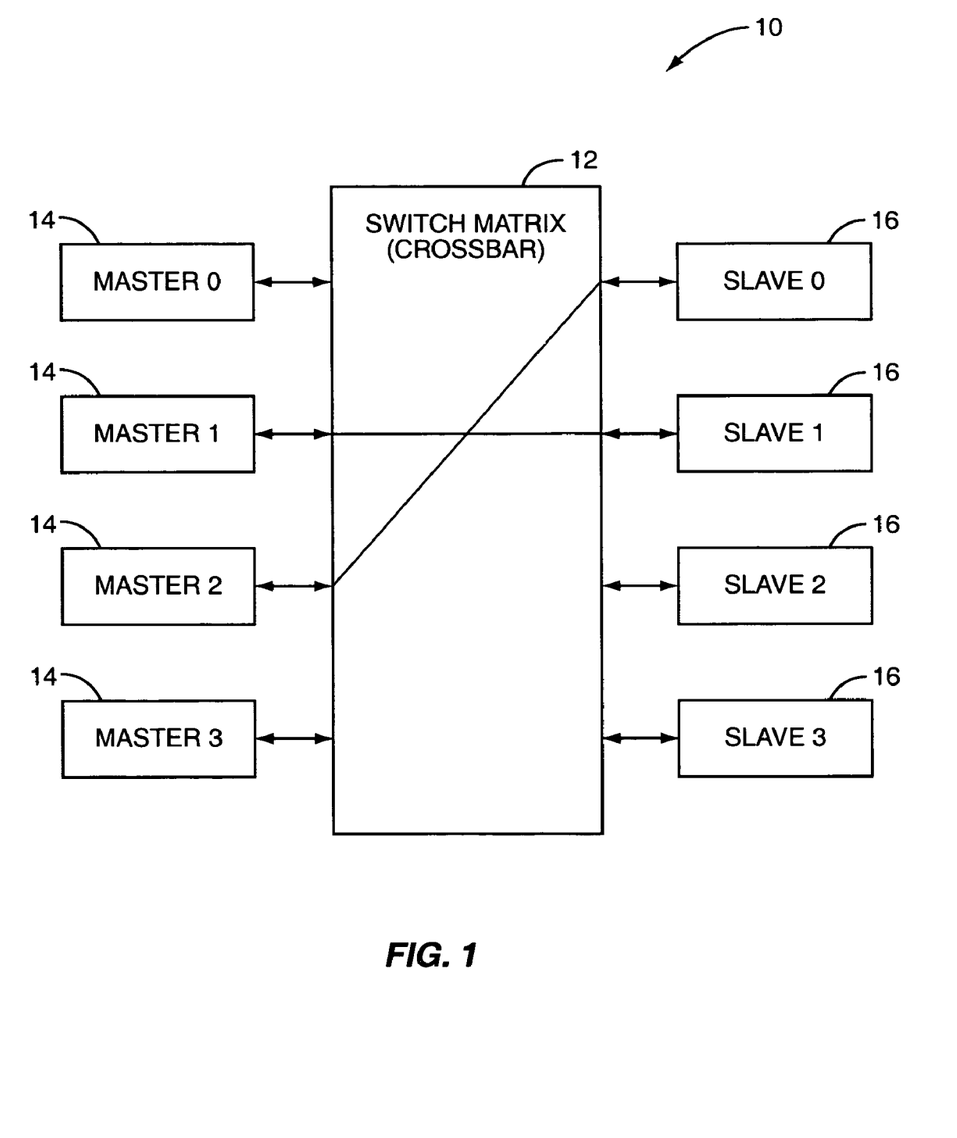
FIG. 1 is a functional block diagram of a system interconnect.
Figure 2:
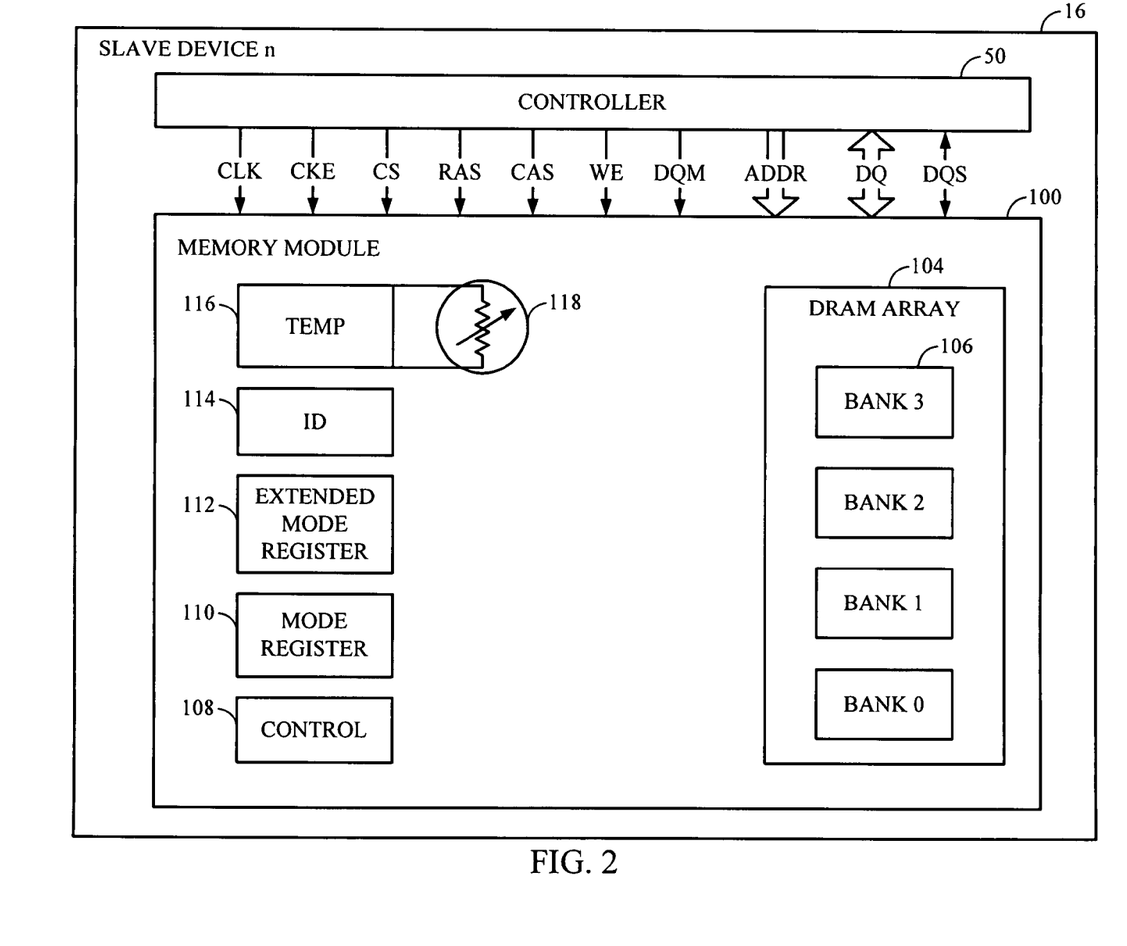
FIG. 2 is a functional block diagram of a slave device comprising a controller and a SDRAM memory module, depicting the functional blocks of the SDRAM module.

FIG. 1 depicts a high performance data transfer system, indicated generally by the numeral 10. A switch matrix 12, also known as a crossbar switch, interconnects a plurality of master devices 14 to a plurality of slave devices 16, in the most general case with any master device having access to any slave device. For example, FIG. 2 depicts Master 1 accessing Slave 1, and simultaneously, Master 2 accessing Slave 0. In some implementations, one or more of the slave devices 16 may include two or more address busses, allowing simultaneous access by more than one master device 14.

One type of slave device 16, depicted in FIG. 2, is a memory sub-system. The memory slave device 16 includes a controller 50 and one or more memory modules 100. The controller 50 may comprise a processor, digital signal processor, micro controller, state machine, or the like. In an exemplary embodiment, the memory module 100 may comprise an SDRAM module 100. The controller 50 directs operations to the SDRAM module 100 by control signals Clock (CLK), Clock Enable (CKE), Chip Select (CS), Row Address Strobe (RAS), Column Address Strobe (CAS), Write Enable (WE), and Data Qualifiers (DQM) as well known in the art. The controller 50 provides a plurality of address lines to the SDRAM module 100, and a bi-directional data bus connects the two. The SDRAM module 100 includes a DRAM array 104, which may be divided into a plurality of banks 106. The DRAM array 104 stores instructions and data, and is read from, written to, and refreshed by SDRAM control circuit 108, under the direction of the controller 50.

The SDRAM module 100 additionally includes a mode register 110 and extended mode register 112. The SDRAM module 100 may additionally include identification information 114, such as vendor ID, version number, manufacture date, die information, and the like. The identification information 114 may be stored in a register; alternatively, it may be hardwired into the die.

The SDRAM module 100 additionally includes a temperature sensing circuit 116, including one or more temperature sensors such as a thermister 118 disposed proximate the DRAM array 104 and operative to sense the temperature of the DRAM array die. The contents of the mode register 110 and extended mode register 112, the SDRAM module identification 114 and the output of the temperature sensor 116 are all examples of data that may be read from the SDRAM module 100, but that are not stored in the DRAM array 104.

Figure 3:
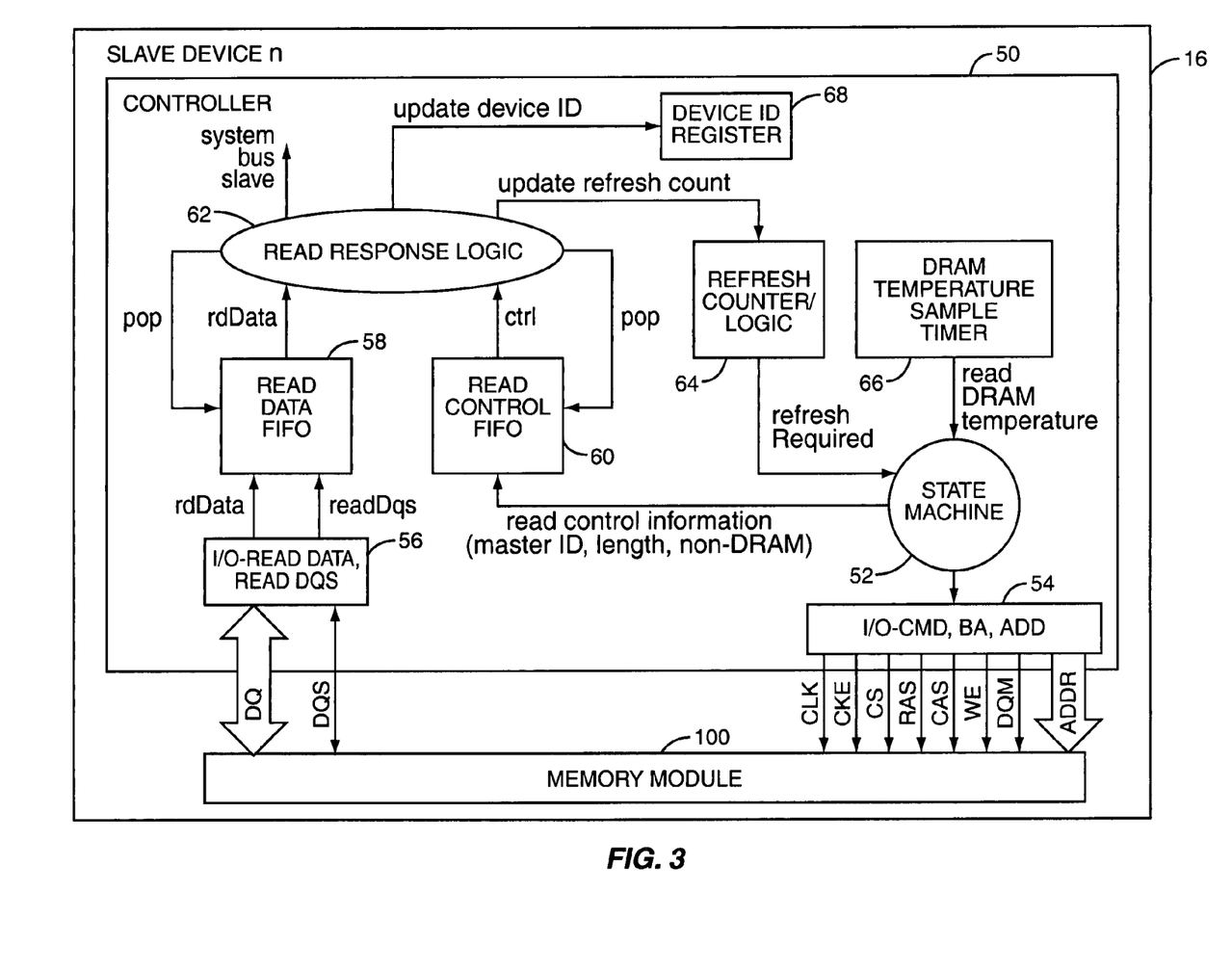
FIG. 3 is a functional block diagram of a slave device comprising a controller and a SDRAM memory module, depicting the functional blocks of the controller.

FIG. 3 depicts another view of the slave memory device 16 showing, in an exemplary embodiment, a functional block diagram of the controller 50. The controller 50 responds to read and write data transfer requests from master devices 14, as determined by the arbitration implemented in the system interconnect 12. The controller 50 directs read and write memory access cycles to the memory module 100 under the control of a state machine 52. The state machine 52 directs an I/O module 54 to generate the proper timing and sequencing of control signals, such as CS, RAS, CAS, WE, DQM, and the like. The I/O block 54 additionally outputs memory address on the address bus, and bank select signals. Synchronous read cycles may be directed to data stored in the memory module 100 within a DRAM array 104, or to data not stored in the DRAM array 104 (such as registers 110, 112, identification information 114, temperature sensor 116, or other non-DRAM array 104 data sources on the SDRAM module 100). Furthermore, synchronous read cycles directed to data stored in the DRAM array 104 and data not stored in the DRAM array 104 may be seamlessly intermixed, to maximize the memory slave device 16 performance.

Read data returned from the memory module 100 is captured on the data bus, using the DQS strobe, at I/O block 56. The read data is then buffered in a data storage buffer, such as FIFO 58. In order to properly dispatch read data to the requesting master device, the controller 50 maintains control information in a buffer, such as the read control FIFO 60. The control information may include the burst length of the read cycle; identification of the requesting master device 14 in the case of read cycles directed to data stored in the DRAM array 104; and a non-DRAM indicator, and optionally a non-DRAM address, in the case of read cycles directed to data not stored in the DRAM array 104. Each instance of control information in the read control FIFO 60 is uniquely associated with read data in the read data FIFO 58.

The controller 50 includes read response logic 62 which extracts read data and associated control information, and dispatches the read data. In the embodiment depicted, the read response logic 62 simultaneously pops the read data FIFO 58 and read control FIFO 60. The read response logic 62 dispatches read data popped from the read data FIFO 58 based on the associated control information popped from the read control FIFO 60. In the case of read data stored in the DRAM array 104, the read data are returned to the requesting master device 14, via the system interconnect 12.

In the case of data not stored in the DRAM array 104—as indicated by the presence of a non-DRAM indicator—the read response logic directs the read data to a destination within the controller 50. In one embodiment, there is only one source of read data not stored in the DRAM array 104, referred to herein as the SDRAM status register. Note that the SDRAM status register need not be an actual register comprising storage elements. Rather, the output of the SDRAM temperature sensing circuit 116 may be read directly by accessing the SDRAM status register. In one embodiment, both temperature and SDRAM identification information 114 are returned to the controller 50 as a result of a synchronous read cycle directed to the SDRAM status register. In other embodiments, additional data may be concatenated and read as part of the SDRAM status register. Regardless of the data included in a read of the SDRAM status register, the read response logic 62 identifies the SDRAM status register data as data not stored in the DRAM array 104 in response to the non-DRAM indicator. Upon this identification, the data are not directed to a requesting master device 14, but are routed to the appropriate circuit in the controller 50.

The SDRAM temperature data is directed to the refresh counter and logic circuit 64, where the optimum refresh rate based on the current actual temperature of the DRAM array 104 die may be calculated. The refresh counter and logic circuit 64 then sends refresh-required signals to the state machine 52 at the optimal rate. This allows the controller to maximize performance and minimize power consumption by spacing refresh cycles out as infrequently as possible to preserve the data state of the SDRAM module 100. The interval at which the SDRAM status register is read—to obtain the current temperature data and determine whether a change in the refresh rate is warranted—is determined by the DRAM temperature sample timer 66, which may be programmable. Alternatively, a read of the SDRAM status register may be initiated by a software command.

The SDRAM identification information is directed to a device ID register 68. The controller 50 may alter various interface parameters (such as timing, initialization procedures, and the like) in response to the SRAM device ID as reflected in the device ID register 68.

In the embodiment discussed above a single SDRAM status register comprises the sole target of read cycles to data not stored in the DRAM array 104, and the SDRAM status register read returns both temperature and SDRAM ID information. In another embodiment, a synchronous read cycle may be directed to a plurality of addresses for data not stored in the DRAM array 104. For example, the mode register 110 and extended mode register 112 may be read. In this embodiment, the temperature sensing circuit 116 may be read separately from the SDRAM identification information 114. In this embodiment, to distinguish the different types of data not stored in the DRAM array 104, a non-DRAM address may be stored with the non-DRAM indicator in the control information, such as in the read control FIFO 60. The read response logic 62 would then consider the non-DRAM address in identifying and directing the data not stored in the DRAM array 104 to the appropriate circuit in the controller 50.

In the embodiments described above, the non-DRAM indicator may comprise a single bit in the control information. In one embodiment, a single controller 50 in a slave device 16 may control a plurality of SDRAM modules 100. In this case, the temperature of each SDRAM module 100 may be monitored separately, to independently optimize the refresh rate for each SDRAM module 100. In this embodiment, the non-DRAM indicator may comprise a plurality of bits. Further, the encoding of the bits may indicate from which of the SDRAM modules 100 the data not stored in the DRAM array 104 was read. In this embodiment, the refresh counter and logic 64, the device ID register 68, and other circuits may be replicated, or may be designed to maintain separate values for each SDRAM module 100, as required or desired.

Figure 4:
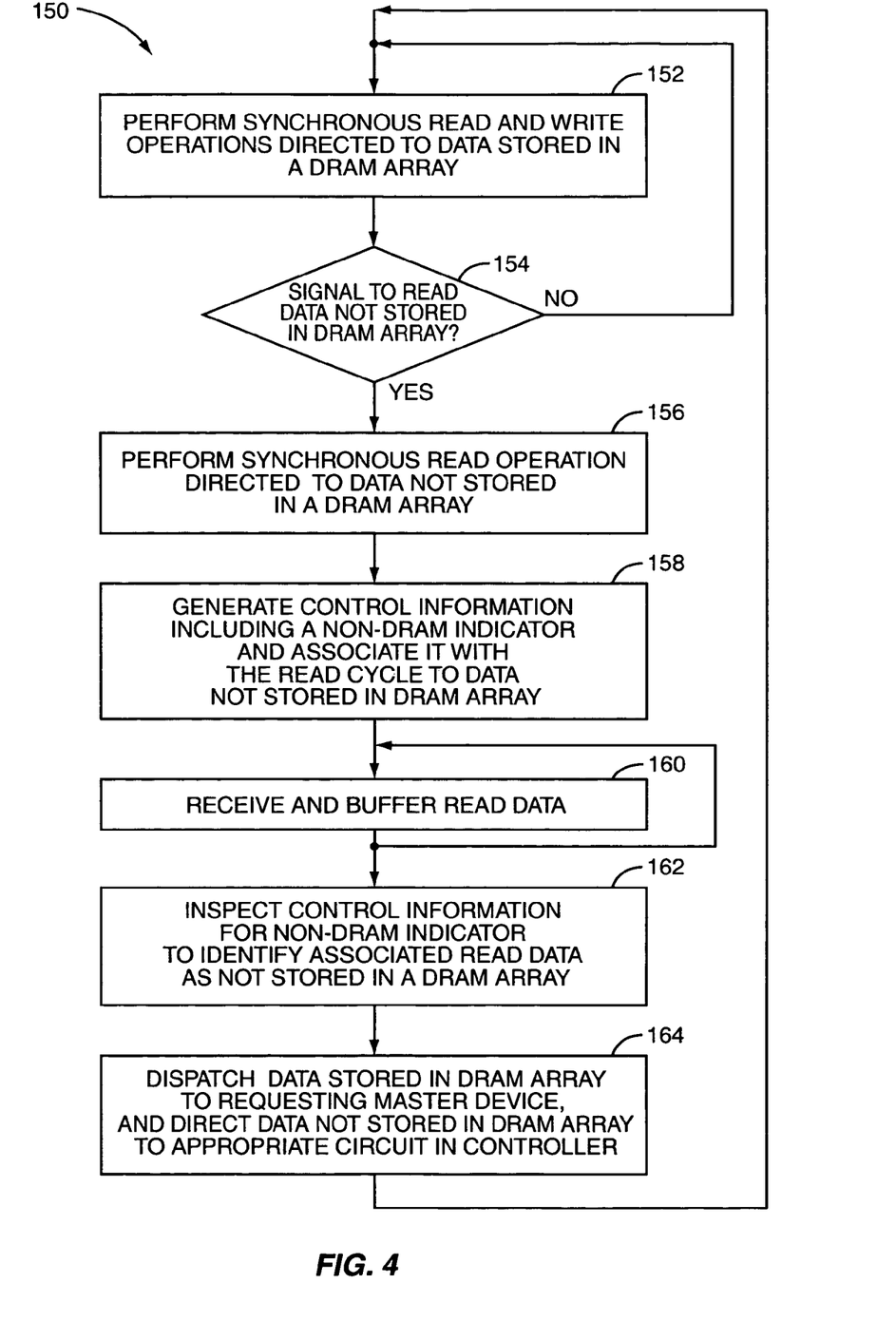
FIG. 4 is a flowchart depicting a method of controlling one or more SDRAM modules.

A method of controlling one or more SDRAM modules is depicted in FIG. 4, indicated generally by the numeral 150. The controller 50 performs synchronous read and write operations directed to data stored in the DRAM array 104 (block 152). This is, of course, normal SDRAM controller operation, and although depicted as a single block or method step, is in fact an ongoing activity. The state machine 52, or other control circuit within the controller 50, then receives a signal to read data not stored in the DRAM array 104 (block 154). This may comprise a "read DRAM temperature" signal from the DRAM temperature sample timer 66. Alternatively, it could be a software command. The controller 50 performs a synchronous read operation directed to data not stored in the DRAM array 104 (block 156), such as to read a SDRAM status register (which may contain temperature information), or to directly read one or more individual sources of data not stored in the DRAM array 104. The state machine 52 generates control information including a non-DRAM indicator, and associates it with the read cycle to data not stored in the DRAM array 104 (bock 158).

The controller 50 receives and buffers read data returned by the SDRAM module 100 (block 160). As indicated by the "looping" arrow, this is an ongoing activity, occurring in response to read cycles issued by the controller 50 earlier in the memory interface pipeline. As buffered data comes up for disposition, the read response logic 62 inspects control information (such as that buffered in the read control FIFO 60) for a non-DRAM indicator (block 62). The read response logic 62 uses the non-DRAM indicator to identify read data associated with that control information as not stored in the DRAM array 104. Based on this identification, the read response logic 62 dispatches read data that was stored in the DRAM array 104 to the requesting master device 14 (identified, for example, by a master device ID in the control information). The read response logic 62 directs read data that was not stored in the DRAM array 104 to the appropriate circuit in the controller 50, such as the refresh counter and control logic 64 for temperature data (block 164). The controller then continues its ongoing activity of performing synchronous read and write operations directed to data stored in the DRAM array 104 (block 152).

The generation and storage of a non-DRAM indicator among the control information maintained for each read cycle allows read cycles directed to data not stored in the DRAM array 104 to be interspersed with read cycles directed to data from the DRAM array 104. This maximizes the memory slave device 16 performance, as all memory access cycles directed to data stored in the DRAM array 104 need not be halted to perform a read cycle directed to data not stored in the DRAM array 104.

The term "module" is used herein in a general sense to denote a functional SDRAM unit that includes a DRAM array 104 and control circuits 108. In particular, the term "module" is not restricted to industry standard identifiers that include the term, such as Single In-line Memory Module (SIMM) or Dual In-line Memory Module (DIMM).

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of controlling one or more SDRAM modules, comprising:

performing one or more synchronous read cycles to a SDRAM module to access DRAM array temperature data not stored in a DRAM array of the SDRAM module;

performing one or more synchronous read cycles to the SDRAM module to access DRAM array data stored in the DRAM array of the SDRAM module;

generating control information associated with each of the one or more read cycles of the DRAM array temperature data not stored in the DRAM array and of the DRAM array data stored in the DRAM array, the generated control information including a non-DRAM indicator associated with each read cycle of the DRAM array temperature data not stored in the DRAM array and a requesting master device identifier associated with each read cycle of the DRAM array data stored in the DRAM array;

buffering the generated control information in a control buffer;

buffering read DRAM array temperature data together with read DRAM array data in a data buffer; and identifying the DRAM array temperature data buffered in the data buffer in response to the non-DRAM indicator of the generated control information buffered in the control buffer.

2. The method of claim 1 further comprising extracting the identified DRAM array temperature data from the data buffer.

3. The method of claim 2 further comprising altering a rate at which one or more of the SDRAM modules is refreshed in response to the extracted DRAM array temperature data.

4. The method of claim 1 further comprising:

identifying the DRAM array data buffered in the data buffer in response to the requesting master device identifier of the generated control information buffered in the control buffer;

extracting the DRAM array data from the data buffer; and forwarding the extracted DRAM array data to the requesting master device identified by the requesting master device identifier.

5. The method of claim 1 wherein the control information includes a read burst length.

6. The method of claim 1 wherein the data buffer is a read data FIFO and the control buffer is a read control FIFO.

7. The method of claim 6 further comprising simultaneously popping the read data FIFO and the read control FIFO.

8. The method of claim 7 wherein identifying the DRAM array temperature data comprises:

popping data from the read data FIFO;

popping control information from the read control FIFO; and identifying the popped data as DRAM array temperature data if the popped control information includes a non-DRAM indicator.

9. The method of claim 1 wherein the non-DRAM indicator comprises a single bit.

10. The method of claim 1 wherein the non-DRAM indicator comprises a plurality of bits, and where an encoding of the non-DRAM indicator bits indicates from which of a plurality of memory modules associated DRAM array temperature data was read.

11. The method of claim 1 wherein performing one or more synchronous read cycles to a SDRAM module to access DRAM array temperature data not stored in a DRAM array of the SDRAM module comprises periodically performing a read cycle directed to a temperature sensing circuit on the SDRAM memory module.

12. The method of claim 11 wherein a period of performing the read cycle directed to the temperature sensing circuit is determined by a programmable counter.

13. The method of claim 11 wherein performing a read cycle directed to a temperature sensing circuit on the SDRAM memory module occurs in response to a software command.

14. The method of claim 11, further comprising adjusting a refresh rate of the SDRAM module in response to a temperature of the SDRAM memory module.

15. A memory controller operative to issue synchronous read cycles to one or more SDRAM memory modules, the synchronous read cycles directed to DRAM array data stored in a DRAM array and to DRAM array temperature data not stored in the DRAM array, the memory controller comprising:

a read data buffer operative to buffer received DRAM array data stored in a DRAM array together with DRAM array temperature data not stored in a DRAM array;

a read control buffer operative to buffer control information associated with each synchronous read cycle of the synchronous read cycles, the control information including a non-DRAM indicator associated with each read cycle of the DRAM array temperature data not stored in the DRAM array and a requesting master device identifier associated with each read cycle of the DRAM array data stored in the DRAM array; and read response logic controlling the read data buffer and operative to identify and extract DRAM array temperature data from the read data buffer in response to the non-DRAM indicator of the control information from the read control buffer.

16. The controller of claim 15 wherein the read data buffer is a read data FIFO and the read control buffer is a read control FIFO.

17. The controller of claim 16 wherein the read data FIFO and the read control FIFO are simultaneously popped by the read response logic.

18. The controller of claim 17 wherein read response logic identifies data popped from the read data FIFO as DRAM array temperature data if control information popped from the read control FIFO includes a non-DRAM indicator.

19. The controller of claim 16 wherein the non-DRAM indicator comprises a single bit.

20. The controller of claim 16 wherein the non-DRAM indicator comprises a plurality of bits, and wherein encoding of the non-DRAM bits indicates from which of a plurality of SDRAM memory modules associated DRAM array temperature data was read.

* * * * *

UNITED STATES PATENT AND TRADEMARK OFFICE
CERTIFICATE OF CORRECTION

PATENT NO. : 7,640,392 B2 Page 1 of 1
APPLICATION NO. : 11/165950
DATED : December 29, 2009
INVENTOR(S) : Robert Michael Walker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 487 days.

Signed and Sealed this

Twenty-first Day of December, 2010

David J. Kappos
*Director of the United States Patent and Trademark Office*